(12) United States Patent
DeMeuse

(10) Patent No.: US 6,268,062 B1
(45) Date of Patent: *Jul. 31, 2001

(54) POLYPROPYLENE BLENDS AND FILMS PREPARED THEREWITH

(75) Inventor: Mark T. DeMeuse, Hockessin, DE (US)

(73) Assignee: Applied Extrusion Technologies, Inc., Peabody, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/055,389

(22) Filed: Apr. 6, 1998

(51) Int. Cl.⁷ .................................................. B32B 27/32
(52) U.S. Cl. ...................... 428/461; 525/240; 428/516; 428/523; 428/910; 428/349
(58) Field of Search ............................ 525/240; 524/427; 428/900, 500, 515, 516, 34.9, 35.8, 35.9, 35.3, 35.4, 461, 523, 349

(56) References Cited

U.S. PATENT DOCUMENTS

| | | | |
|---|---|---|---|
| 4,472,227 | * | 9/1984 | Toyoda et al. .................. 156/244.11 |
| 4,786,533 | * | 11/1988 | Crass et al. ............................. 428/13 |
| 5,026,592 | * | 6/1991 | Janocha et al. ....................... 428/204 |
| 5,443,895 | * | 8/1995 | Peiffer et al. ......................... 428/220 |
| 5,500,282 | | 3/1996 | Heffelfinger et al. . |
| 5,530,065 | | 6/1996 | Farley et al. . |
| 5,624,621 | * | 4/1997 | Asanuma et al. ................. 264/176.1 |
| 5,691,043 | * | 11/1997 | Keller et al. .......................... 428/212 |
| 5,753,762 | * | 5/1998 | Leuckx et al. ....................... 525/240 |
| 5,804,524 | * | 9/1998 | Reddy et al. ......................... 502/113 |
| 5,888,640 | * | 4/1999 | Marotta et al. .................... 428/308.4 |
| 5,998,039 | | 12/1999 | Tanizaki et al. . |
| 6,037,417 | | 3/2000 | Nguyen et al. . |

FOREIGN PATENT DOCUMENTS

| | | |
|---|---|---|
| 0 841 371 | 1/1994 | (EP) . |
| WO 96/02388 | 2/1996 | (EP) . |
| 07 16121 | 6/1996 | (EP) . |
| WO 97/10300 | 3/1997 | (EP) . |
| WO 96/11218 | 7/1997 | (EP) . |
| 0 841 372 | 5/1998 | (EP) . |
| 0 841 373 | 5/1998 | (EP) . |
| WO 00/11077 | 7/1999 | (EP) . |

* cited by examiner

*Primary Examiner*—Paul Thibodeau
*Assistant Examiner*—D. Lawrence Tarazano
(74) *Attorney, Agent, or Firm*—Caesar, Rivise, Bernstein, Cohen, & Pokotilow, Ltd.

(57) ABSTRACT

Disclosed are blends of polypropylene prepared with a Ziegler-Natta catalyst system and polypropylene prepared with a metallocene catalyst system. These blends are found to have a unique combination of properties as compared to the properties of either polymer alone. Particularly improved are the tensile properties.

29 Claims, No Drawings

POLYPROPYLENE BLENDS AND FILMS PREPARED THEREWITH

This invention relates to novel compositions comprised of blends or mixtures of propylene polymers prepared by use of different types of catalysts. Specifically it relates to blends of propylene polymers prepared using a Ziegler-Natta catalyst and propylene polymers prepared using a metallocene catalyst.

BACKGROUND OF THE INVENTION

In recent years, vast quantities of propylene polymers have been prepared via the well known Ziegler-Natta catalyst system. This catalyst consists essentially of the reaction product of titanium halide, typically $TiCl_4$, with an alkyl aluminum compound, typically an alkyl aluminum sesquichloride. This is an extremely effective catalyst for preparing highly crystalline polymers and in its various forms, has become the industry standard.

More recently, much work has been done to develop new catalyst systems, one result of which has been the discovery of metallocene catalyst systems. Metallocene catalysts are defined as bridged bis dicyclopentadienyl or bis indenyl Group 4,5 or 6 transition metal dihalide derivatives. Specific metallocene catalysts known to be useful for producing polypropylene are discussed, inter alia, in EPA 485,820; 485,821; 485,822; 485,823; 518,092 and 519,237 and in U.S. Pat. Nos. 5,145,819 and 5,296,434. Other references that discuss the metallocene catalyzed process include EPA 351,932 and U.S. Pat. Nos. 5,055,438; 5,234,800; 5,272,016; 5,272,236 and 5,278,272. All of the cited documents are incorporated hereinto by reference.

The polymers resulting from metallocene catalysis are said to be of extremely uniform steric structure. Depending on the specific metallocene employed, the polymer can be of an a syndiotactic structure wherein the pendant methyl groups on the polymer chain are located on alternating carbon atoms and are alternately oriented above and below the plane of the chain. With another metallocene, the polymer can be of an isotactic structure wherein all of the pendant methyl groups are still located on alternate carbon atoms, but they are disposed predominantly on the same side of the chain.

In addition to the high degree of stereoregularity of the polymer chains, there is a very high degree of uniformity of molecular weight among the polymer chains, i.e., the molecular weight distribution is narrower than that found in conventional isotactic polypropylene. Thus, whereas a conventional polypropylene has a polydispersity (i.e. the ratio of weight average molecular weight to number average molecular weight) on the order of about 7, a metallocene catalyzed polypropylene prepared by the same manufacturer has a polydispersity on the order of about 3. Likewise, in the manufacture of copolymers or terpolymers, the metallocene catalyst leads to a more even distribution of the comonomer or comonomers throughout the product. Yet another good feature of the metallocene polymers is that they have a lower concentration of low molecular weight, xylene soluble materials.

The narrower molecular weight distribution of the metallocene catalyzed homopolypropylene and copolymer and the more even distribution of the comonomer in the copolymer lead to greater uniformity of the properties of the product whether it be the homopolymer or the copolymer. Thus, the metallocene catalyzed products exhibit a sharper melting point and a more uniform intrinsic viscosity throughout the product. These property improvements translate into improved flow properties and thus to improved processing during film extrusion and drawing. Processing is thus significantly facilitated.

However, in attempting to manufacture oriented packaging films with the metallocene catalyzed polypropylene in conventional processes and equipment, it has been found that the cast films exhibit very poor optical properties. Specifically, the films cast preparatory to drawing to effect orientation are extremely hazy, bordering on being translucent. In addition, they have a rough, sand paper-like surface. Drawn films prepared from these polymers are also found to exhibit a high degree of haze, making them unsuitable for high quality packaging applications.

It is an objective of this invention to provide a polymer composition containing metallocene catalyzed polypropylene that can be employed in the manufacture of polypropylene film. It is a further objective of the invention to provide superior polypropylene films comprising metallocene catalyzed polypropylene, which films exhibit a combination of improved properties as compared with polypropylene films heretofore known to the art.

BRIEF DESCRIPTION OF THE INVENTION

The invention to be described hereinafter is a film forming composition comprising a blend comprised of about 10 to 90 percent by weight, based on the total weight of its polypropylene component, of a polypropylene prepared by use of a Ziegler-Natta catalyst and about 90 to 10 percent of a polypropylene prepared by use of a metallocene catalyst. The blends preferably comprise about 25 to 75 percent Ziegler-Natta catalyzed polypropylene and 75 to 25 percent of the metallocene catalyzed polypropylene. Most preferred are blends comprised of about 40 to 60 percent by weight Ziegler-Natta catalyzed polypropylene and 60 to 40 percent by weight metallocene catalyzed polypropylene.

The invention also includes biaxially oriented films prepared from a blend comprised of about 10 to 90 percent by weight, based on the total weight of the polymeric components, of a polypropylene prepared by use of a Ziegler-Natta catalyst and about 90 to 10 percent of a polypropylene prepared by use of a metallocene catalyst. More preferably, the films are prepared with a blend comprised of 25 to 75 percent Ziegler-Natta catalyzed polypropylene and 75 to 25 percent metallocene catalyzed polypropylene. Most preferably, the films are prepared with a blend comprised of 40 to 60 percent Ziegler-Natta catalyzed polypropylene and 60 to 40 percent metallocene catalyzed polypropylene.

The polypropylene blends according to the invention and the films prepared therewith can also contain up to about 30%, preferably up to about 20% and most preferably up to about 10% by weight of a low molecular weight hydrocarbon resin, based on the total weight of the polypropylene blend and the resin.

DETAILED DESCRIPTION OF THE INVENTION

When reference is made herein to polypropylene, it is intended to indicate a crystalline propylene homopolymer or a copolymer of propylene with another α-olefin having about 2 to 5 carbon atoms in an amount insufficient to have a significant effect on the crystallinity of the polypropylene. Typically, this is ethylene in an amount up to about 6% by weight. This will be the case either with reference to polypropylene prepared with metallocene catalyst (sometimes referred to as "metallocene polypropylene" or as "metallocene polymer") or to the polypropylene prepared with a Ziegler-Natta catalyst (sometimes referred to as "Ziegler polypropylene" or "Ziegler polymer"). The polypropylene employed is preferably the homopolymer.

Suitable Ziegler polypropylenes are the commercially available isotactic polypropylenes having a melt flow rate between about 2 and 10 gm/10 min at 230° C. and 2.16 Kg. load and a DSC melting point of about 160 to 166° C. One polypropylene that can be used is the isotactic homopolymer having a melt flow rate of about 3.5 dg/min at 230° C. and 2.16 Kg. load, available from Aristech Chemical Corporation, Pittsburgh, Pa. Suitable polypropylenes are also available from Montell, Inc. Wilmington, Del., Exxon Chemical Company, Baytown, Tex. and Fina Oil and Chemical Co., Deer Park, Tex.

The metallocene polypropylene employed in the manufacture of the films of this invention can be either an isotactic or a syndiotactic polymer. The preferred polymer is the isotactic species because this species has a higher melting point and accordingly, can be employed in higher temperature environments than can the syndiotactic species. A preferred isotactic metallocene polypropylene is a homopolymer having a melt flow rate between about 1 and 10 and more preferably, between about 1 and 5 gm/10 minutes at 230° C. under a loading of 2.16 kg. A suitable such polymer is available under the designation Fina EOD 96-12 from Fina Oil and Chemical Co. Deer Park, Tex.

In accordance with this invention, it has been found that blends of a Ziegler polypropylene with a metallocene polymer within the concentration ranges specified herein can be biaxially oriented to prepare films that exhibit the desirable properties of each of the polymers contained in the blend. Thus, these films exhibit the good optical properties of the Ziegler polypropylene, i.e., a low level of haze along with a high level of gloss and clarity. It is found that the optical properties of the Ziegler polymer are substantially unaffected by the greater haze and decreased clarity and gloss that are characteristic of the metallocene polymer up to a concentration level of about 40–50%.

With respect to another important parameter, it is found that biaxially oriented films prepared with the blends according to the invention exhibit an improved moisture vapor transmission rate (MVTR) as compared with those of the Ziegler polypropylene component alone. In this case, the effect appears to be more of a weighted average effect up to a point. That is to say, MVTR decreases with even low levels of metallocene polymer concentration and continues to decrease as the metallocene polymer content increases, and eventually at a concentration of about 40–50%, MVTR approximates that of the metallocene polymer alone. It is surprising that the metallocene polymer controls the MVTR of the blend even though it is not the major component of the blend.

The most surprising effect of the presence of the metallocene polypropylene in the blends is its effect on the tensile properties of the film. Blending of the Ziegler polypropylene and the metallocene polypropylene yields compositions that, in some concentration ranges, exhibit tensile properties superior to those of either the Ziegler polymer or the metallocene polymer alone. This effect is particularly noticeable in the tensile modulus as will be seen in the examples set forth below. The effect holds for both the tensile strength, in which the metallocene polymer is superior and for the tensile modulus, in which the Ziegler polymer is superior. Also surprisingly, the improved tensile properties effect holds across the entire spectrum of concentration ratios. As will be demonstrated in the examples set forth hereinbelow, there is a clear synergy between the two types of polypropylene that could not have been predicted with respect to the tensile properties.

Preferred biaxially oriented films prepared with the blends of Ziegler and metallocene polypropylene according to the invention are stand alone films, i.e., they are of a thickness that they can be employed in packaging applications or other applications without the necessity of having another layer for support. The thickness of the film following orientation is typically in the range of about 0.25 to 1.0 mil (25 to 100 gauge). A preferred film thickness is from about 0.5 to about 0.8 mil (50 to 80 gauge).

With respect to the gauge of the films, it will be apparent that, due to the improvements in the stiffness (modulus) of the films of the invention, it will now be possible to prepare commercially acceptable films of thinner gauge than has heretofore been possible. The economic advantage of a thinner film is readily seen.

The film according to the invention can be rendered opaque by incorporating a particulate organic or inorganic opacifier into the polymer composition. Certain opacifiers impart opacity by causing microvoiding of the polymer matrix about the opacifier particles during the orientation drawing operation. Examples of such opacifiers include calcium carbonate, silicon dioxide, aluminum silicate and magnesium silicate. A preferred opacifier is calcium carbonate of about 1 to 5 micron particle size. An opacifier loading of about 4 to 30% by weight, based on the weight of the mixture of polypropylenes is usually sufficient to impart a desirable degree of opacity to the film.

Other materials such as certain coloring pigments can cause opacity without voiding if present in sufficiently high loading. An example of such a coloring pigment is titanium dioxide. In the case of opaque films, the total film thickness is typically somewhat thicker than is that of a clear film. Thus, an opaque film is usually on the order of about 1 to 1.5 mil in thickness and preferably on the order of about 1 to 1.3 mil with the functional layers, if present, being of the same thickness as those on a clear film.

Other conventional additives, in conventional amounts, can be included in the compositions and films of the invention. Suitable other conventional additives include antioxidants, pigments, orientation stress modifiers, flame retardants, antistatic agents, antiblocking agents, antifoggants and slip agents.

Another class of additives that can be included in the compositions of the invention are low molecular weight hydrocarbon resins(frequently referred to as "hard resins".)

The term "low molecular weight hydrocarbon resins" refers to a group of hydrogenated or unhydrogenated resins derived from olefin monomers, such as the resins derived from terpene monomers, coal tar fractions and petroleum feedstocks. Suitable such resins prepared from terpene monomers (e.g., limonene, alpha and beta pinene) are Piccolyte resins from Hercules Incorporated, Wilmington, Del., and Zonatac resins from Arizona Chemical Company, Panama City, Fla. Other low molecular weight resins are prepared from hydrocarbon monomers, as $C_5$ monomers (e.g., piperylene, cyclopentene, cyclopentadiene, and isoprene), and mixtures thereof. These are exemplified by the hydrogenated thermally oligomerized cyclopentadiene and dicyclopentadiene resins sold under the trade name Escorez (for example Escorez 5300) by Exxon Chemical Co. of Baytown, Tex. Others are prepared from $C_9$ monomers, particularly the monomers derived from $C_9$ petroleum fractions which are mixtures of aromatics; including styrene, methyl styrene, alpha methyl styrene, vinyl naphthalene, the indenes and methyl indenes and, additionally, pure aromatic monomers, including styrene, α-methyl-styrene and vinyltoluene. Examples of these resins include hydrogenated α-methyl styrene—vinyl toluene resins sold under the trade name Regalrez by Hercules Incorporated of Wilmington, Del.

In general, the low molecular weight resins that can be included in the compositions of this invention are characterized by a molecular weight less than about 5000, a $T_g$ of about 50 to 100° C. and a softening point less than about 140° C.

It has been found that films prepared with a composition according to this invention that includes a minor amount of a low molecular weight resin have an even lower MVTR than is realized with the blend as discussed above. The low molecular weight resin can be included in the compositions at a concentration up to about 30% by weight, preferably up to about 4 to 20% and most preferably about 4 to 10% by weight based on the total weight of the composition. Improved MVTR is seen without any adverse effect on the other desirable improvements in the optical properties or the tensile properties.

For many applications, films according to the invention are employed as a layer of a composite, multilayer structure. In such applications, they usually serve as the base or core layer and provide self-supporting character to the composite structure. In this way, the advantageous properties of the films, particularly the improved tensile properties and MVTR are imparted to the composite structure.

When the films of the invention are employed in composite structures, the other layers are usually functional layers containing specific materials intended to serve specific purposes. It will be apparent that, when additives are selected for use in the various layers of a composite film structure, no additive should be included that can negatively affect the performance of the layer into which it is incorporated or that can migrate into another layer and negatively affect the performance of that layer in carrying out its intended function.

The layers applied to the core layer may or may not contain polypropylene. For example, composite films frequently carry a heat seal layer. Such layers comprise material of lower melting point than the core so that when heat is applied to effect the seal, the orientation of the core layer will not be disturbed. A commonly used heat seal layer is comprised of a terpolymer of propylene, ethylene and butene-1. Other polymers that can be employed as a heat seal layer include polyvinyl or polyvinylidene chloride.

Another frequently used functional layer is a cold seal layer. In this layer, the polymer component will frequently be the same as that of the core layer, though, here again, it need not be the same. To prepare a cold seal film, a cold seal adhesive, such as, e.g., a rubber adhesive is applied to the surface of the oriented film.

Other commonly used functional layers include a slip layer to facilitate handling of the film during later converting operations. Such a layer is comprised of a polypropylene containing a slip agent such as a high molecular weight fatty acid amide. A functional layer may also contain an antiblock additive to facilitate unwinding of the film after it has been wound at the terminus of the film manufacturing process The polypropylene content of such layers likewise may or may not comprise a Ziegler polypropylene and metallocene polypropylene blend according to the invention.

Another functional layer that is commonly employed is a barrier coating receiving layer. An example of a good and highly effective such layer is a mixture of polypropylene and about 10 to 30% by weight of a low molecular weight hydrocarbon resin as described hereinabove. The polypropylene content of this layer can be a neat polypropylene or a blend of polypropylenes according to the instant invention. This layer is treated by an oxidation process such as corona or flame treatment to impart sufficient polarity to its surface to cause a barrier coating to adhere to it. Barrier coatings that can be applied to such a layer include, e.g. a metal such as aluminum, an oxygen barrier such as an ethylene—vinyl alcohol or a vinyl or vinylidene chloride polymer, or a flavor and aroma barrier such as an acrylic polymer or copolymer.

In the multilayer film embodiment in which the film of the invention is the core layer, the thickness of the core layer is preferably about 0.23 to 0.9 mil (23 to 90 gauge), while that of the individual functional surface layers is about 0.1 to 0.15 mil (10 to 15 gauge).

Films according to the invention can be prepared by methods conventionally employed in the film making art. With specific reference to the multilayer films of the invention, there can be employed coextrusion, extrusion coating or lamination. The preferred method is coextrusion wherein the various layers are extruded simultaneously through a multi-layer die and immediately brought together in the molten state so that they are permanently bonded upon solidifying.

Film forming and drawing to effect orientation can be carried out by conventional techniques, i.e. the well known tubular (bubble) process or the equally well known tenter process can be employed.

When the films are prepared by the bubble process, the draw is effected simultaneously and uniformly in the machine and cross directions to about 3 to 7× and preferably 5× to 7×. Using the tenter process, drawing is carried out sequentially to about 3× to 7× in the machine direction and to about 7 to 11× in the cross direction.

The films of the invention are useful in any of the applications in which conventional isotactic polypropylene films are presently employed. They are particularly useful as packaging films, either as shrinkable films or as barrier or printable films after suitable treatment to render the surface polar so that a polar coating material will adhere thereto. They can also be used as the dielectric component in electrical condensers and as label stock wherein their greater stiffness as compared to conventional polypropylene is advantageous. Other suitable applications will be apparent to the practitioner.

EXAMPLE 1

Pellets of isotactic Ziegler polypropylene (Fina 3371 homopolypropylene from Fina Oil and Chemical Co., Deer Park, Tex.) and pellets of isotactic metallocene polypropylene (Fina EOD 96-12, also from Fina Oil and Chemical Co.) were dry mixed in various weight ratios and melt blended in a Leistritz twin screw extruder (American Leistritz Extruder Corporation, Somerville, N.J.). The blended polymer mass was extruded into a water bath at room temperature to quench it and was then chopped into pellets. Compounding was carried out at 239 to 248° C. and an extruder speed of 170 RPM.

These compositions were cast onto a 56° C. casting roll using a Killion single screw Killion Extruders, Inc., Verona, N.J.). Casting conditions were a melt temperature of 249° C. and film casting speed of 3.2 feet per minute. All films were drawn 7× by 7× at a temperature of 140° C. to effect biaxial orientation. After orientation, the films were heat set 10%. Drawing was carried out simultaneously in the longitudinal and transverse directions on a T. M. Long stretcher (T.M. Long Corporation, Somerville, N.J.)

Relevant physical properties of the films are recorded in Table 1 below. Tensile properties were determined on an Instron tensile tester; optical properties according to ASTM D-1003 and MVTR according to ASTM D-372.

TABLE 1

| % Metal-locene | Modulus (psi) | Strength (psi) | Elongation (%) | Haze (%) | Clarity (%) | Gloss (%) | MVTR[1] |
|---|---|---|---|---|---|---|---|
| 0 | 381,222 | 33,611 | 96.5 | 0.20 | 99.4 | 95.2 | 0.353 |
| 10 | 403,271 | 35,131 | 93.5 | 0.21 | 99.4 | 95.4 | 0.335 |
| 20 | 407,900 | 35,833 | 92.1 | 0.18 | 99.4 | 95.5 | 0.335 |
| 30 | 415,959 | 38,710 | 92.1 | 0.17 | 99.3 | 95.6 | 0.323 |
| 40 | 421,710 | 35,964 | 86.8 | 0.22 | 99.4 | 95.5 | 0.304 |
| 50 | 426,487 | 34,381 | 83.6 | 0.22 | 99.0 | 93.7 | 0.313 |
| 75 | 440,290 | 34,919 | 85.6 | 0.44 | 98.0 | 93.5 | 0.293 |
| 100 | 415,837 | 33,281 | 86.4 | 0.72 | 97.1 | 91.6 | 0.305 |

[1]MVTR unit is gm/100 sq. in/24 hr measured on 1 mil film according to ASTM D-372

In the above table, the synergism between the two types of polymer with respect to the tensile properties is readily seen, beginning at a metallocene polymer concentration of about 40% and continuing as the metallocene content increases. Likewise the virtual lack of effect of the hazy character of the metallocene polymer on the optical properties of the polymer blend until the metallocene polypropylene concentration reaches about 50% is readily seen.

EXAMPLE 2

Pellets of isotactic Ziegler polypropylene (Montell PH384 homopolypropylene from Montell, Inc., Wilmington, Del.) and pellets of isotactic metallocene polypropylene (Fina EOD 96-12, from Fina Oil and Chemical Co.) were dry mixed in various weight ratios and Melt blended in a Leistritz twin screw extruder (American Leistritz Extruder Corporation, Somerville, N.J.). The blended polymer mass was extruded into a water bath at room temperature to quench it and was then chopped into pellets. Compounding was carried out at 237 to 241° C. and an extruder speed of 180 RPM.

These compositions were cast onto a 45 to 47° C. casting roll using a Killion single screw extruder (Killion Extruders, Inc., Verona, N.J.). Casting conditions were a melt temperature of 256° C. and extruder speed of 3.1 to 3.2 FPM.

All films were drawn 7× by 7× at a temperature of 140° C. to effect biaxial orientation. After orientation, the films were heat set 10%. Drawing was carried out simultaneously in The longitudinal and transverse directions on a T. M. Long stretcher (T.M. Long on, Somerville, N.J.).

Relevant properties of the films are recorded in Table 2, below. Tensile properties were determined using the same methods as were employed in Example 1.

TABLE 2

| % metal-locene | Modulus (psi) | Strength (psi) | % Elongation | % Haze | % Clarity | % Gloss | MVTR |
|---|---|---|---|---|---|---|---|
| 0 | 432,016 | 31,921 | 99.4 | 0.36 | 99.2 | 94.7 | 0.345 |
| 10 | 410,819 | 31,625 | 93.6 | 0.26 | 99.3 | 95.4 | 0.326 |
| 20 | 432,949 | 33,791 | 90.2 | 0.22 | 99.3 | 95.4 | 0.322 |

TABLE 2-continued

| % metal-locene | Modulus (psi) | Strength (psi) | % Elongation | % Haze | % Clarity | % Gloss | MVTR |
|---|---|---|---|---|---|---|---|
| 30 | 442,625 | 31,743 | 88.2 | 0.25 | 99.2 | 95.0 | 0.327 |
| 40 | 458,086 | 32,544 | 85.9 | 0.22 | 99.1 | 95.3 | 0.300 |
| 100 | 415,837 | 33,281 | 86.4 | 0.72 | 97.1 | 91.6 | 0.305 |

In this example, wherein the Ziegler polymer is a higher modulus product to begin with, the effect of blending with the metallocene polypropylene is not so dramatic as in Example 1. However, the effect is there, starting at about 30% and continuing as the Metallocene content is increased. Again, the lack of effect of the metallocene polymer on the opticals of the blend is also readily seen.

EXAMPLE 3

As a comparative example, a series of compositions were prepared in which the Ziegler polymers employed in Examples 1 and 2 above were blended with no metallocene polymer present. These were processed into films and tested in the same manner as were the blended compositions of Examples 1 and 2. Processing conditions were as follows:
a) Compounding at 243 to 245° C. and 170 RPM;
b) Casting at 249° C. and 3.1 to 3.2 FPM; 54–56° C. casting roll; and
c) Drawing 6× by X at 140° C.

The optical properties and the MVTR data for these films are recorded in Table 3, below.

TABLE 3

| % Fina 3371 | % Haze | % Clarity | % Gloss | MVTR |
|---|---|---|---|---|
| 0 | 0.77 | 98.8 | 93.6 | 0.374 |
| 25 | 0.56 | 99.0 | 93.9 | 0.382 |
| 50 | 0.39 | 99.0 | 94.2 | 0.357 |
| 75 | 0.49 | 99.0 | 94.4 | 0.380 |
| 100 | 0.33 | 99.1 | 94.3 | 0.383 |

The optical properties of these films are not the same as reported in Examples 1 and 2 for films of the unblended Ziegler polymer because the film is drawn to a lesser degree and thus it is thicker than those films. However, it is clear that blending of the films result in a weight average type of effect on the optical properties, unlike the situation in the blended films wherein the hazier metallocene polymer did not seriously affect the opticals of the Ziegler polymer until it became the major polymer in the blend.

EXAMPLE 4

Following the procedures described in Example 1, two polymer blends were prepared using the polymers employed in Example 1, i.e. Fina 3371 Ziegler polypropylene and 'Fine EOD 96-12 metallocene polypropylene.

One of these blends consisted of 95% by weight of the Ziegler polypropylene and 5% by weight of a low molecular weight hydrocarbon resin (PS 676 from Hercules Incorporated). The other blend consisted of 55% by weight of the Fina 3371 polypropylene, 40% weight of the Fina EOD 96-12 metallocene polypropylene and 5% by weight of the PS 676 low molecular weight hydrocarbon resin.

The two compositions were compounded on the Leistritz extruder at 236–237° C. and and extruder speed of 170 RPM. Films were cast onto a 56° C. casting roll using a Killion Casting conditions were a melt temperature of 250° C. and 3.2 FPM. The films were oriented 6× by 6×. MVTR data for these films are recorded in Table 4, Below. The data for 100% Fina 3371 polypropylene and the 60/40 blend are from Example 1. MVTR data are normalized for a film of 1 mil thickness.

TABLE 4

| % Ziegler polymer | % Metallocene polymer | % PS 676 | MVTR |
|---|---|---|---|
| 100 | 0 | 0 | 0.353 |
| 95 | 0 | 5 | 0.358 |
| 60 | 40 | 0 | 0.304 |
| 55 | 40 | 5 | 0.258 |

The significant improvement in the MVTR resulting from the inclusion of the low molecular weight hydrocarbon resin in the blend composition is clearly evident.

What is claimed is:

1. A biaxially oriented non-heat sealable polypropylene film constituting either a single layer of a single layer film or a core layer of a multilayer film, said polypropylene film being comprised of a polymer blend comprising about 90 to 10 percent by weight, based on the total weight of its polypropylene component, of an isotactic polypropylene homopolymer prepared by use of a Ziegler-Natta catalyst and about 10 to 90 percent of an isotactic polypropylene homopolymer prepared by use of a metallocene catalyst.

2. A biaxially oriented film according to claim 1, including up to about 30% by weight of a low molecular weight hydrocarbon resin, based on the total weight of the film, said low molecular weight hydrocarbon resin being characterized by a molecular weight less than about 5000, a $T_g$ of about 50 to 100° C. and a softening point less than about 140° C.

3. A biaxially oriented film according to claim 2, wherein the low molecular weight hydrocarbon resin content is about 4 to 10%.

4. A biaxially oriented polypropylene film according to claim 1, wherein the polypropylene blend also contains about 4 to 30% by weight of an opacifying pigment, whereby the film is rendered opaque when it is oriented.

5. A biaxially oriented polypropylene film according to claim 4 wherein the opacifying pigment is $CaCO_3$.

6. A biaxially oriented non-heat sealable film according to claim 1, said film being a core layer of a multilayer film, said core layer having on at least one of its surfaces at least one functional layer selected from a heat seal layer, a slip layer, a cold seal layer and a barrier coating receiving layer.

7. A film according to claim 6 wherein the functional layer is a barrier coating receiving layer to which has been applied a barrier coating selected from a metal coating, an oxygen barrier coating and a flavor and aroma barrier coating.

8. A biaxially oriented non-heat sealable polypropylene film constituting either a single layer of a single layer film or a core layer of a multi-layer film, said polypropylene film being comprised of a polymer blend comprising about 25 to 75 percent by weight, based on the total weight of the polypropylene component, of an isotactic polypropylene homopolymer prepared by use of a Ziegler-Natta catalyst and about 75 to 25 percent of an isotactic polypropylene homopolymer prepared by use of a metallocene catalyst.

9. A biaxially oriented film according to claim 8, including up to about 30% by weight of a low molecular weight hydrocarbon resin, based on the total weight of the film said low molecular weight hydrocarbon resin being characterized by a molecular weight less than about 5000, a $T_g$ of about 50 to 100° C. and a softening point less than about 140° C.

10. A biaxially oriented film according to claim 9 wherein the low molecular weight hydrocarbon resin content is about 4 to 10%.

11. A biaxially oriented polypropylene film according to claim 8 wherein the polypropylene blend also contains about 4 to 30% by weight of an opacifying pigment, whereby the film is rendered opaque when it is oriented.

12. A biaxially oriented polypropylene film according to claim 11 wherein the opacifying pigment is $CaCO_3$.

13. A biaxially oriented non-heat sealable film according to claim 8 said film being a core layer of a multilayer film, said core layer having on at least one of its surfaces at least one functional layer selected from a heat seal layer, a slip layer, a cold seal layer and a barrier coating receiving layer.

14. A film according to claim 13 wherein the functional layer is a barrier coating receiving layer to which has been applied a barrier coating selected from a metal coating, an oxygen barrier coating, and a flavor and aroma barrier coating.

15. A biaxially oriented non-heat sealable polypropylene film constituting either a single layer of a single layer film or a core layer of a multilayer film, said polypropylene film being comprised of a polymer blend comprising about 40 to 60 percent by weight, based on the total weight of its polypropylene component, of an isotactic polypropylene homopolymer prepared by use of a Ziegler-Natta catalyst and about 60 to 40 percent of an isotactic polypropylene homopolymer prepared by use of a metallocene catalyst.

16. A biaxially oriented film according to claim 15, including up to about 30% by weight of a low molecular weight hydrocarbon resin, based on the total weight of the film said low molecular weight hydrocarbon resin being characterized by a molecular weight less than about 5000, a $T_g$ of about 50 to 100° C. and a softening point less than about 140° C.

17. A biaxially oriented film according to claim 16 wherein the low molecular weight resin content is about 4 to 10%.

18. A biaxially oriented polypropylene film according to claim 15 wherein the polypropylene blend also contains about 4 to 30% by weight of an opacifying pigment, whereby the film is rendered opaque when it is oriented.

19. A biaxially oriented polypropylene film according to claim 18 wherein the opacifying pigment is $CaCO_3$.

20. A biaxially oriented non-heat sealable film according to claim 7, said film being a core layer of a multilayer film, said core layer having on at least one of its surfaces at least one functional layer selected from a heat-seal layer, a slip layer, a cold seal layer and a barrier coating receiving layer.

21. A film according to claim 20 wherein the functional layer is a barrier coating receiving layer to which has been applied a barrier coating selected from a metal coating, an oxygen barrier coating, and a flavor and aroma barrier coating.

22. A polypropylene blend useful for the manufacture of biaxially oriented polypropylene film, said polypropylene blend comprising about 90 to 10% by weight, based on the total weight of its polypropylene component, of an isotactic polypropylene homopolymer prepared by use of a Ziegler-Natta catalyst and about 10 to 90% of an isotactic polypropylene homopolymer prepared by use of a metallocene catalyst, said homopolymer prepared by use of the Ziegler-Natta catalyst having a melt-flow rate between about 2 and 10 gm/10 min. at 230° C. and 2.16 Kg. load and said polypropylene homopolymer prepared by use of a metallocene catalyst having a melt-flow rate between about 1 and 10 gm/10 min. at 230° C. and 2.16 Kg. load.

23. The biaxially oriented non-heat sealable polypropylene film of claim 1, wherein the isotactic polypropylene homopolymer prepared by use of the Ziegler-Natta catalyst has a melt-flow rate between about 2 and 10 gm/10 min. at 230° C. and 2.16 Kg. load and said isotactic polypropylene homopolymer prepared by use of the metallocene catalyst has a melt-flow rate of between about 1 and 10 gm/10 min. at 230° C. and 2.16 Kg. load.

24. A polypropylene blend useful for the manufacture of polypropylene film constituting either a single layer of a single layer film or a core layer of a multilayer film, said blend comprised of about 10 to 90 percent by weight, based on the total weight of its polypropylene component, of an isotactic polypropylene homopolymer prepared by use of a Ziegler-Natta catalyst and having a melt-flow rate between about 2 and 10 gm/10 min at 230° C. and 2.16 Kg. load and about 90 to 10 percent of an isotactic polypropylene homopolymer prepared by use of a metallocene catalyst and having a melt-flow rate between about 1 and 10 gm/10 min at 230° C. and 2.16 Kg. load.

25. A polypropylene blend according to claim 24, including up to about 30% by weight of a low molecular weight hydrocarbon resin said low molecular weight hydrocarbon resin being characterized by a molecular weight less than about 5000, a $T_g$ of about 50 to 100° C. and a softening point less than about 140° C.

26. A polypropylene blend according to claim 25 wherein the low molecular weight hydrocarbon resin content is about 4 to 10%.

27. A polypropylene blend useful for the manufacture of polypropylene film constituting either a single layer of a single layer film or a core layer of a multilayer film, said blend comprised of about 25 to 75 percent by weight, based on the total weight of the polymeric components of an isotactic polypropylene homopolymer prepared by use of a Ziegler-Natta catalyst and having a melt-flow rate between about 2 and 10 gm/10 min. at 230° C. and 2.16 Kg. load and about 75 to 25 percent of an isotactic polypropylene homopolymer prepared by use of a metallocene catalyst and having a melt-flow rate between about 1 and 25 gm/10 min. at 230° C. and 2.16 Kg. load.

28. A polypropylene blend according to claim 27, including up to about 30% by weight of a low molecular weight hydrocarbon resin said low molecular weight hydrocarbon resin being characterized by a molecular weight less than about 5000, a $T_g$ of about 50 to 100° C. and a softening point less than about 140° C.

29. A polypropylene blend according to claim 28 wherein the low molecular weight hydrocarbon resin content is about 4 to 10%.

* * * * *